United States Patent
Kobuna et al.

(10) Patent No.: US 12,187,148 B2
(45) Date of Patent: Jan. 7, 2025

(54) CHARGE AND DISCHARGE CONTROL DEVICE

(71) Applicant: TOYOTA JIDOSHA KABUSHIKI KAISHA, Toyota (JP)

(72) Inventors: Shunsuke Kobuna, Sunto-gun (JP); Masato Ehara, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 505 days.

(21) Appl. No.: 17/562,149

(22) Filed: Dec. 27, 2021

(65) Prior Publication Data

US 2022/0219561 A1 Jul. 14, 2022

(30) Foreign Application Priority Data

Jan. 14, 2021 (JP) .................................. 2021-004548

(51) Int. Cl.
| | |
|---|---|
| *H02J 7/00* | (2006.01) |
| *B60L 53/62* | (2019.01) |
| *B60L 55/00* | (2019.01) |

(52) U.S. Cl.
CPC ............... *B60L 53/62* (2019.02); *B60L 55/00* (2019.02); *H02J 7/0013* (2013.01); *H02J 7/0048* (2020.01)

(58) Field of Classification Search
None
See application file for complete search history.

(56) References Cited

U.S. PATENT DOCUMENTS

| | | | |
|---|---|---|---|
| 8,179,139 B2 * | 5/2012 | Kawasumi | H01M 50/574 |
| | | | 324/426 |
| 8,509,976 B2 | 8/2013 | Kempton | |
| 9,043,038 B2 | 5/2015 | Kempton | |
| 9,754,300 B2 | 9/2017 | Kempton et al. | |
| 10,374,433 B2 | 8/2019 | Ito | |
| 11,318,862 B2 * | 5/2022 | Ueda | H01M 10/625 |
| 2008/0039980 A1 * | 2/2008 | Pollack | B60L 53/68 |
| | | | 700/295 |

(Continued)

FOREIGN PATENT DOCUMENTS

| | | |
|---|---|---|
| JP | 2013-051851 A | 3/2013 |
| JP | 2013-520942 A | 6/2013 |

(Continued)

*Primary Examiner* — Arun C Williams
(74) *Attorney, Agent, or Firm* — Oliff PLC

(57) ABSTRACT

A charge and discharge control device includes a controller configured to: predict, for each of vehicles included in a vehicle group, a remaining capacity of a storage battery mounted on each of the vehicles within a future predetermined period using a behavior prediction model that predicts behavior of each of the vehicle; optimize, for each vehicle, an instruction value of a charge and discharge power amount of the storage battery within the predetermined period such that an accumulation value of the charge and discharge power amounts follows a demand value for the vehicle group while minimizing a degradation amount of the storage battery using the predicted remaining capacities of the storage batteries and a battery degradation prediction model that predicts the degradation amount of the storage battery from the remaining capacity; and control a charging and discharging operation of the storage battery according to the optimized instruction value.

1 Claim, 3 Drawing Sheets

(56) References Cited

U.S. PATENT DOCUMENTS

| | | | | |
|---|---|---|---|---|
| 2009/0229900 A1* | 9/2009 | Hafner | .................... | B60L 53/65 |
| | | | | 903/930 |
| 2012/0133337 A1* | 5/2012 | Rombouts | ............. | G07F 15/006 |
| | | | | 320/155 |
| 2014/0336965 A1 | 11/2014 | Mori et al. | | |
| 2016/0033582 A1* | 2/2016 | You | ...................... | G01R 31/374 |
| | | | | 324/426 |
| 2021/0086647 A1* | 3/2021 | Kiessling | ................ | B60L 53/67 |

FOREIGN PATENT DOCUMENTS

| | | |
|---|---|---|
| JP | 2013-210340 A | 10/2013 |
| JP | 6304008 B2 | 4/2018 |
| JP | 2019-106771 A | 6/2019 |

\* cited by examiner

CHARGE AND DISCHARGE CONTROL DEVICE

The present application claims priority to and incorporates by reference the entire contents of Japanese Patent Application No. 2021-004548 filed in Japan on Jan. 14, 2021.

BACKGROUND

The present disclosure relates to a charge and discharge control device.

In recent years, it has attracted attention to operate storage batteries of electric vehicles as a part of a virtual power plant (VPP) by connecting a function of the electric vehicles as storage batteries to an infrastructure of electric power and optimizing charge and discharge amounts and charge and discharge timing of the storage batteries of the electric vehicles.

SUMMARY

When charging and discharging of storage batteries is performed without considering the function of the electric vehicles as moving means, energy required for movement of the electric vehicles may not be secured, and there is a possibility that electricity shortage occurs. In addition, when charging and discharging of storage batteries is performed without considering the states of the storage batteries, degradation of the storage batteries may progress. Because of such a background, it has been demanded for provision of a technique for making an accumulation value of charge and discharge amounts of storage batteries of electric vehicles follow a demand value of a charge and discharge power amount for a vehicle group demanded by an electric power company or an energy management system (EMS) while suppressing electricity shortage and degradation of the storage batteries.

There is a need for a charge and discharge control device capable of making an accumulation value of charge and discharge amounts of storage batteries of electric vehicles follow a demand value of a charge and discharge power amount for a vehicle group while suppressing electricity shortage and degradation of the storage batteries.

According to one aspect of the present disclosure, there is provided a charge and discharge control device including a controller configured to: predict, for each of vehicles included in a vehicle group, a remaining capacity of a storage battery mounted on each of the vehicles within a future predetermined period using a behavior prediction model that predicts behavior of each of the vehicle; optimize, for each of the vehicles, an instruction value of a charge and discharge power amount of the storage battery within the predetermined period such that an accumulation value of the charge and discharge power amounts of the storage batteries of the vehicles follows a demand value of the charge and discharge power amount for the vehicle group while minimizing a degradation amount of the storage battery of each of the vehicles using the predicted remaining capacities of the storage batteries and a battery degradation prediction model that predicts the degradation amount of the storage battery from the remaining capacity of the storage battery; and control a charging and discharging operation of the storage battery of each vehicle according to the optimized instruction value.

DETAILED DESCRIPTION

Hereinafter, a charge and discharge control device according to an embodiment will be described in detail with reference to the drawings.

First, a configuration of a charge and discharge control device according to an embodiment will be described with reference to FIG. 1.

Figure 1:
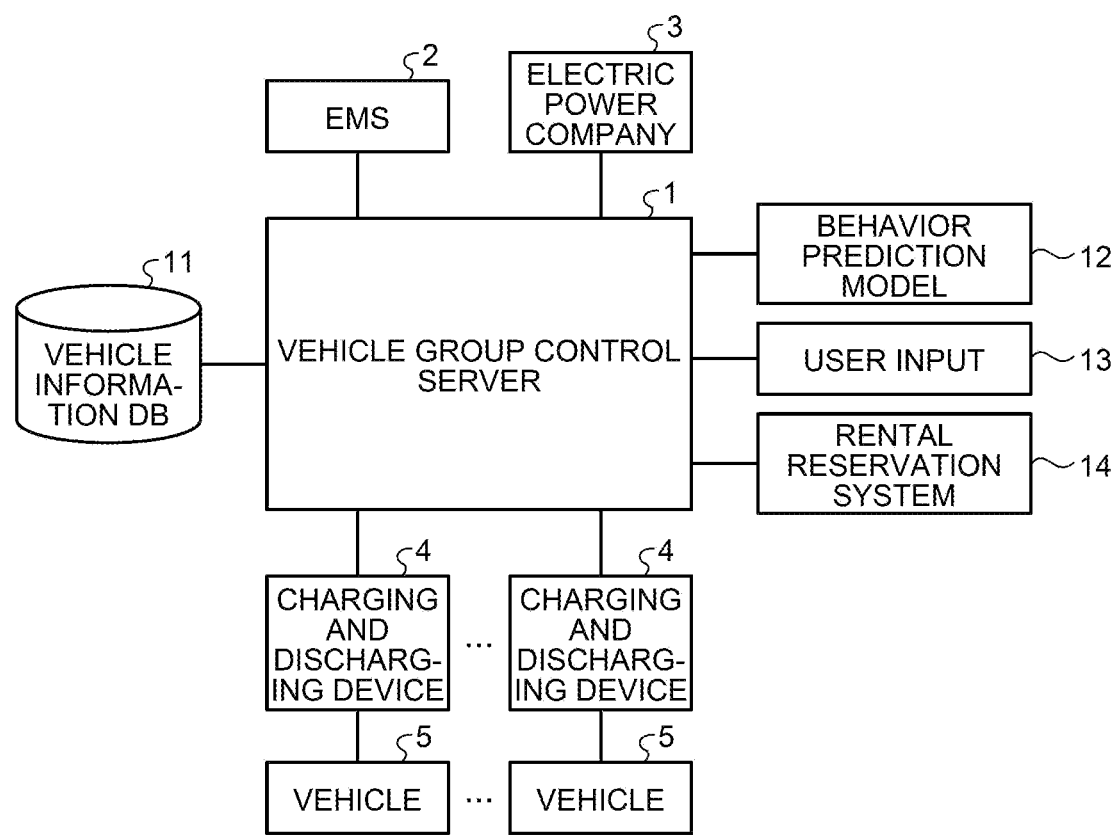
FIG. 1 is a block diagram illustrating a configuration of a charge and discharge control device according to an embodiment.

FIG. 1 is a block diagram illustrating a configuration of a charge and discharge control device according to an embodiment. As illustrated in FIG. 1, a charge and discharge control device according to an embodiment is a device that realizes a virtual power plant using storage batteries such as batteries mounted on vehicles such as electric vehicles, and includes a vehicle group control server 1 implemented by an information processing device such as a computer.

The vehicle group control server 1 is a device that controls the charging and discharging operation of the storage batteries mounted on vehicles 5 connected to charging and discharging devices 4 such that the demand value of charge and discharge power amount of the vehicle group acquired from an energy management system (EMS) 2 or an electric power company 3. It is assumed that the charging and discharging devices 4 are connected to a power system via a power line and are also connected to the vehicle group control server 1 in a manner enabling information communication with each other via an information communication line.

In the present embodiment, the vehicle group control server 1 includes a vehicle information database (vehicle information DB) 11. The vehicle information DB 11 stores, as vehicle information, information on the vehicles 5 enabling control of a charging and discharging operation of the storage batteries. Examples of the vehicle information include user information of the vehicles 5, identification information of the vehicles 5, position information of the vehicles 5, information on capacities and current remaining capacities (state of charge (SOC)) of the storage batteries mounted on the vehicles 5, and information on upper and lower limit values of the SOC of a storage battery specified by a user of the vehicle 5.

The vehicle group control server 1 includes a behavior prediction model 12 that predicts future behavior (position information and the like) of each of vehicles, the vehicle information on which is stored in the vehicle information DB 11. Specifically, the behavior prediction model 12 is a computer program for implementing prediction of future behavior of the vehicles 5, and is formed from past behavior data of the vehicles 5, and may be formed by, for example, machine learning using date and time information or weather information as an input value and position information of the vehicle 5 corresponding to the input value as an output value. For example, by inputting information of date and time when behavior of the vehicle 5 is to be predicted and information of the weather to the behavior prediction model 12, position information of the vehicle 5 of a company or the like corresponding to the input content may be acquired as an output.

The vehicle group control server 1 may acquire use schedule information (user input) 13 of the vehicles 5 input to a predetermined application program by users and rental reservation information of the vehicles 5 stored in a rental reservation system 14, via an electric communication line.

In the charge and discharge control device having such a configuration, the vehicle group control server 1 executes the charge and discharge control processing described below, thereby causing the accumulation value of the charge and discharge amounts of the storage batteries of vehicles to follow the demand value of the charge and discharge instruction value for a vehicle group while suppressing the electricity shortage and the degradation of the storage battery of each vehicle. Hereinafter, a flow of the charge and discharge control processing according to the embodiment will be described with reference to FIG. 2.

Figure 2:
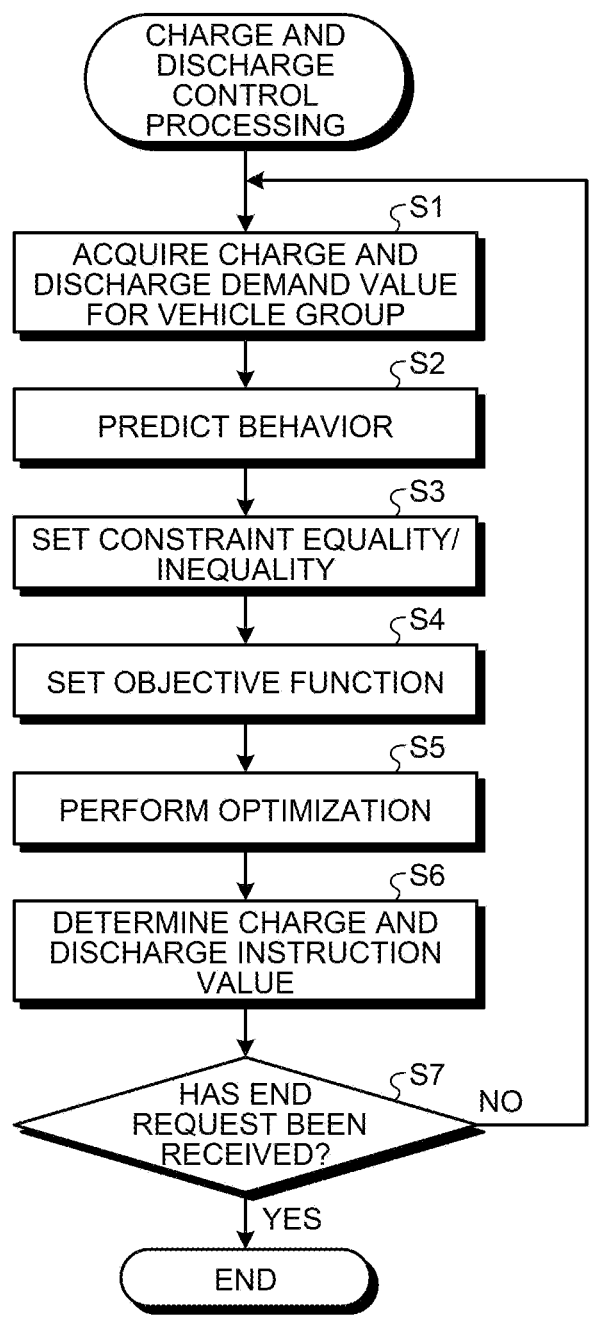
FIG. 2 is a flowchart illustrating a flow of charge and discharge control processing according to an embodiment.

FIG. 2 is a flowchart illustrating a flow of charge and discharge control processing according to the embodiment. The flowchart illustrated in FIG. 2 starts at the timing when a command to perform the charge and discharge control processing is input to the vehicle group control server 1, and the charge and discharge control processing proceeds to processing of step S1.

In the processing of step S1, the vehicle group control server 1 acquires a demand value of a charge and discharge power amount for a vehicle group within a future predetermined period from the EMS 2 or the electric power company 3 via the electric communication line. It is assumed that the EMS 2 and the electric power company 3 calculate the demand value of the charge and discharge power amount for the vehicle group within a future predetermined period such as 24 hours from that time on a cycle of a predetermined control period such as 30 minutes. Thus, the processing of step S1 is completed, and the charge and discharge control processing proceeds to processing of step S2.

In the processing of step S2, the vehicle group control server 1 predicts the connection state with the charging and discharging devices 4 and the power amount necessary for traveling within a future predetermined period for each of the vehicles 5, the vehicle information of which is registered in the vehicle information DB 11, using the information acquired from the behavior prediction model 12, the user input 13, and the rental reservation system 14. For example, in a case where one of the vehicles 5 is scheduled to move from the home to the office within a future predetermined period, the vehicle group control server 1 predicts that the vehicle 5 is connected to one of the charging and discharging devices 4 within a period in which the vehicle 5 is located at the home and the office, and calculates the power amount necessary for the vehicle 5 to move from the home to the office using the position information of the home and the office. Thus, the processing of step S2 is completed, and the charge and discharge control processing proceeds to processing of step S3.

In the processing of step S3, the vehicle group control server 1 sets inequality constraint having the charge and discharge power amount and the upper and lower limit values of the SOC of the storage battery within a future predetermined period for each vehicle 5. In addition, the vehicle group control server 1 sets an equality constraint having an accumulation value of the instruction values of the charge and discharge power amount for the vehicles within the future predetermined period as a demand value of the charge and discharge power amount for the vehicle group within the future predetermined period. Note that the vehicle group control server 1 sets the power amount necessary for traveling that has been predicted in the processing of step S2 or the SOC of the storage battery specified by a user to the lower limit value of the SOC of the storage battery. In addition, the vehicle group control server sets a specified value of the SOC of the storage battery for avoiding full charging or suppressing degradation, or an upper limit value of the SOC of the storage battery specified by a user to the upper limit value of the SOC of the storage battery. Thus, the processing of step S3 is completed, and the charge and discharge control processing proceeds to processing of step S4.

Figure 3:
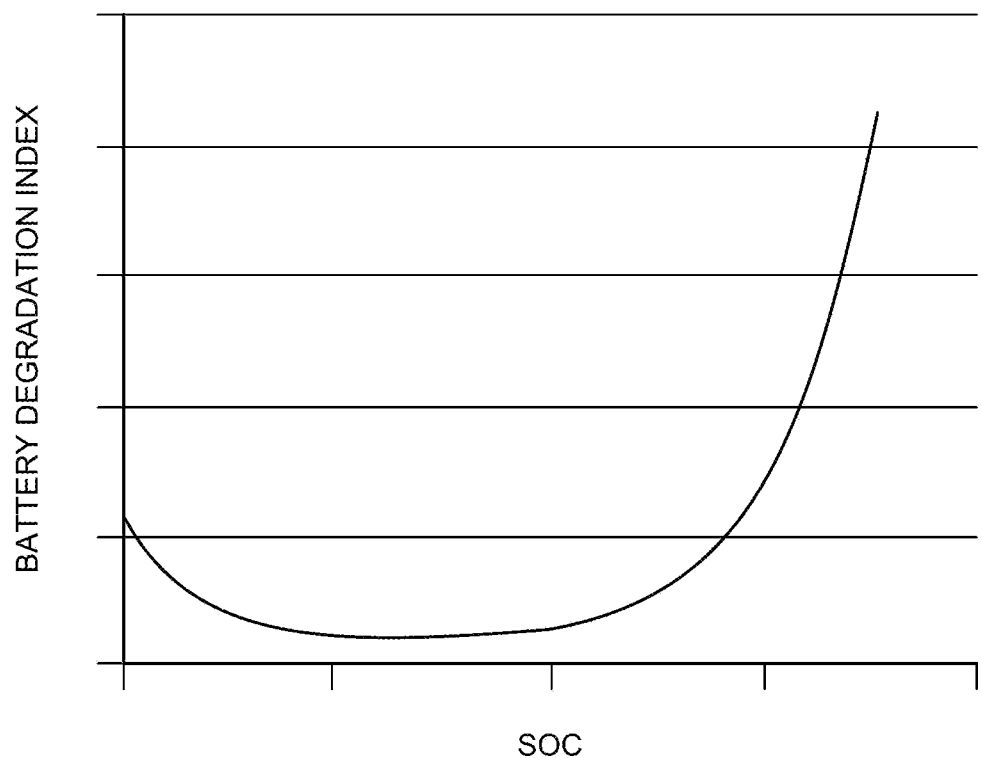
FIG. 3 is a diagram illustrating an example of a relationship between a degradation index and an SOC of a storage battery.

In the processing of step S4, the vehicle group control server 1 sets an objective function having a prediction value of the SOC of the storage battery within a future predetermined period as an input variable and a degradation amount of the storage battery within the future predetermined period as an output variable using a battery degradation prediction model having the SOC of the storage battery as an input value and a degradation index of the storage battery as an output value as illustrated in FIG. 3, for example. Thus, the processing of step S4 is completed, and the charge and discharge control processing proceeds to processing of step S5.

In the processing of step S5, the vehicle group control server 1 optimizes the instruction value of the charge and discharge power amount within the future predetermined period for each vehicle 5 based on the prediction value of the SOC of the storage battery within the future predetermined period such that the value of the objective function set in the processing of step S4 becomes minimum while satisfying the constraint set in the processing of step S3. At this time, the vehicle group control server 1 calculates the prediction value of the SOC of the storage battery using the current SOC of the storage battery, the capacity of the storage battery, the instruction value of the charge and discharge power amount, and the connection state with the charging and discharging device 4 and the power amount necessary for traveling that has been calculated in the processing of step S2. Then, the vehicle group control server 1 stores information of the optimized instruction value of the charge and discharge power amount for a future predetermined period as a charge and discharge plan. Thus, the processing of step S5 is completed, and the charge and discharge control processing proceeds to processing of step S6.

The vehicle group control server 1 may optimize the instruction value of the charge and discharge power amount such that the difference value between the accumulation value of the instruction values of the charge and discharge power amount for the vehicles within the future predetermined period and a demand value of the charge and discharge power amount for the vehicle group within the future predetermined period is minimized. In addition, the vehicle group control server 1 may reduce unfairness between users about battery degradation by optimizing the instruction values of the charge and discharge power amounts such that the variance value of the degradation amounts of the storage batteries is minimized. In addition, the vehicle group control server 1 may optimize the instruction values of the charge and discharge power amounts such that the power consumption (power efficiency of the charging and discharging devices 4, and power saving amount by standby mode and stop mode of the charging and discharging devices 4) of the vehicle group is minimized.

In the processing of step S6, the vehicle group control server 1 controls the charging and discharging operation of the storage batteries mounted on the vehicles in accordance with the charge and discharge plan stored in the processing of step S5. Thus, the processing of step S6 is completed, and the charge and discharge control processing proceeds to processing of step S7.

Note that, in a case where the processing of steps S2 to S5 described above is performed for a long period or a large vehicle group, the calculation time may become long, and a quick response may not be followed. In a virtual power plant using the storage batteries of the vehicles 5, it is required to follow a quick response such as a sudden change in demand, entrance and exit of vehicles, load frequency control (LFC), and a governor free operation. Therefore, it is desirable that the vehicle group control server 1 perform, in combination with the processing of step S6, feedback control for correcting the difference between the instruction value and the actual value of the charge and discharge power amounts of the storage batteries in a cycle shorter than the calculation cycle of steps S2 to S5 of about 1 to 10 seconds. At this time, it is desirable that the vehicle group control server 1 set a value range in which degradation is allowable with respect to the optimum value of the charge and discharge power amount of each vehicle obtained by the processing of steps S2 to S5, and corrects the charge and discharge power amount of each vehicle within the value range.

In the processing of step S7, the vehicle group control server 1 determines whether or not an end request signal of the charge and discharge control processing has been received. As a result of the determination, when an end request signal has been received (step S7: Yes), the vehicle group control server 1 ends a series of pieces of charge and discharge control processing. On the other hand, when an end request signal has not been received (step S7: No), the vehicle group control server 1 returns the charge and discharge control processing to the processing of step S1.

In step S1 of next time, the vehicle group control server 1 may correct the demand value of the charge and discharge power amount acquired from the EMS 2 or the electric power company 3 based on the difference value between the actual value of the accumulation value of the charge and discharge power amount and the demand value of the charge and discharge power amount for the vehicle group. As a result, it is possible to improve the followability to the demand value of the charge and discharge power amount against a disturbance such as entrance and exit of vehicles.

As is clear from the above description, in the charge and discharge control processing according to an embodiment, the vehicle group control server 1 predicts, for each vehicle 5, the remaining capacity of the storage battery within a future predetermined period using the behavior prediction model that predicts the behavior of the vehicle 5, and optimizes, for each vehicle, the instruction value of the charge and discharge power amount of the storage battery within the predetermined period such that the accumulation value of the charge and discharge power amounts of the storage batteries of the vehicles follows the demand value while minimizing the degradation amount of the storage battery of each vehicle using the predicted remaining capacities of the storage batteries and the battery degradation prediction model that predicts the degradation amount of the storage battery from the remaining capacity of the storage battery. Therefore, it is possible to cause the accumulation value of the charge and discharge amounts of the storage batteries of the electric vehicles to follow the demand value of the charge and discharge power amount for the vehicle group while suppressing the electricity shortage and the degradation of the storage batteries.

The charge and discharge control device according to the present disclosure predicts, for each vehicle, the remaining capacity of the storage battery within a future predetermined period using the behavior prediction model that predicts the behavior of the vehicle, and optimizes, for each vehicle, the instruction value of the charge and discharge power amount of the storage battery within the predetermined period such that the accumulation value of the charge and discharge power amounts of the storage batteries of the vehicles follows the demand value while minimizing the degradation amount of the storage battery of each vehicle using the predicted remaining capacities of the storage batteries and the battery degradation prediction model that predicts the degradation amount of the storage battery from the remaining capacity of the storage battery. Therefore, it is possible to cause the accumulation value of the charge and discharge amounts of the storage batteries of the electric vehicles to follow the demand value of the charge and discharge power amount for the vehicle group while suppressing the electricity shortage and the degradation of the storage batteries.

Although the disclosure has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charge and discharge control device comprising a controller configured to:
predict, for each of vehicles included in a vehicle group, a remaining capacity of a storage battery mounted on each of the vehicles within a future predetermined period using a behavior prediction model that predicts behavior of each of the vehicles;
optimize, for each of the vehicles, an instruction value of a charge and discharge power amount of the storage battery within the predetermined period such that an accumulation value of the charge and discharge power amounts of the storage batteries of the vehicles follows a demand value of the charge and discharge power amount for the vehicle group while minimizing a degradation amount of the storage battery of each of the vehicles using the predicted remaining capacities of the storage batteries and a battery degradation prediction model that predicts the degradation amount of the storage battery from the remaining capacity of the storage battery;
control a charging and discharging operation of the storage battery of each of the vehicles according to the optimized instruction value; and
after controlling the charging and discharging operation of the storage battery of each of the vehicles according to the optimized instruction value, perform feedback control for correcting a deviation of an actual value of the charge and discharge power amount of the storage battery from the instruction value in a cycle shorter than a cycle for calculating the instruction value.

* * * * *